(12) United States Patent
Lejdström et al.

(10) Patent No.: US 7,848,997 B2
(45) Date of Patent: Dec. 7, 2010

(54) SECURITIES SETTLEMENT SYSTEM

(75) Inventors: Bengt Lejdström, Sollentuna (SE); Oskar Sander, Stockholm (SE); Johan Söderqvist, Nacka (SE)

(73) Assignee: OMX Technology AB, Stockholm (SE)

( * ) Notice: Subject to any disclaimer, the term of this patent is extended or adjusted under 35 U.S.C. 154(b) by 243 days.

(21) Appl. No.: 11/724,312

(22) Filed: Mar. 15, 2007

(65) Prior Publication Data

US 2007/0288347 A1    Dec. 13, 2007

Related U.S. Application Data

(60) Provisional application No. 60/789,574, filed on Apr. 6, 2006.

(51) Int. Cl.
*G06Q 40/00*    (2006.01)

(52) U.S. Cl. .......................................... 705/37; 705/35

(58) Field of Classification Search .................. 705/35, 705/37
See application file for complete search history.

(56) References Cited

U.S. PATENT DOCUMENTS

| | | | |
|---|---|---|---|
| 5,978,780 A | 11/1999 | Watson | |
| 6,076,074 A | 6/2000 | Cotton et al. | |
| 6,247,000 B1 | 6/2001 | Hawkins et al. | |
| 7,225,153 B2 | 5/2007 | Lange | |
| 7,376,622 B1 | 5/2008 | Padalino et al. | |
| 7,523,054 B2 | 4/2009 | Tyson-Quah | |
| 7,536,354 B1 | 5/2009 | deGroeve et al. | |
| 7,660,762 B1 | 2/2010 | Mellina | |
| 2002/0032642 A1 | 3/2002 | Chichilnisky | |
| 2002/0087454 A1 | 7/2002 | Calo et al. | |
| 2002/0099641 A1 | 7/2002 | Mills et al. | |
| 2002/0133455 A1 | 9/2002 | Howorka et al. | |
| 2002/0188552 A1 | 12/2002 | Kavounas et al. | |
| 2003/0225681 A1 | 12/2003 | Cummings et al. | |
| 2004/0128222 A1 | 7/2004 | Turbeville et al. | |
| 2004/0128223 A1 | 7/2004 | Kuhn et al. | |
| 2004/0148252 A1 | 7/2004 | Fleishman | |
| 2004/0153403 A1 | 8/2004 | Sadre | |
| 2005/0010613 A1 | 1/2005 | Lejdstrom et al. | |
| 2005/0086165 A1 | 4/2005 | Pawelczyk et al. | |
| 2005/0203836 A1* | 9/2005 | Woodward et al. | 705/39 |
| 2005/0222938 A1 | 10/2005 | Treacy et al. | |
| 2005/0246251 A1* | 11/2005 | Feldhoffer et al. | 705/30 |

(Continued)

FOREIGN PATENT DOCUMENTS

EP    1396803    3/2004

OTHER PUBLICATIONS

Declaration of Non-Establishment of International Search Report (2 pages).

(Continued)

*Primary Examiner*—Jagdish N Patel
*Assistant Examiner*—Sara Chandler
(74) *Attorney, Agent, or Firm*—Nixon & Vanderhey P.C.

(57) ABSTRACT

A securities settlement system for settling trades in central depository systems is disclosed. The securities settlement system includes a credit line structure forming a tree structure with a number of levels with credit nodes. The securities settlement system also includes a control system for minimizing the transfer of cash between accounts by propagating cash obligations for each node in the tree structure to a highest common node.

23 Claims, 8 Drawing Sheets

U.S. PATENT DOCUMENTS

| | | | |
|---|---|---|---|
| 2006/0074793 A1* | 4/2006 | Hibbert et al. | 705/38 |
| 2006/0095361 A1 | 5/2006 | Rude | |
| 2006/0167784 A1* | 7/2006 | Hoffberg | 705/37 |
| 2006/0224494 A1 | 10/2006 | Pinkava | |
| 2007/0078736 A1* | 4/2007 | Chand et al. | 705/35 |
| 2007/0118459 A1 | 5/2007 | Bauerschmidt et al. | |
| 2007/0136180 A1 | 6/2007 | Salomon et al. | |
| 2008/0071664 A1 | 3/2008 | Silverman et al. | |
| 2008/0270278 A1 | 10/2008 | Cummings et al. | |

OTHER PUBLICATIONS

Declaration of Non-Establishment of International Search Report mailed Jun. 27, 2007 in corresponding PCT Application No. PCT/EP2007/053307.

Search Report, Written Opinion for SG 200807168-0 mailed Mar. 5, 2009.

Office Action mailed Apr. 26, 2010 in co-pending U.S. Appl. No. 11/724,313.

Office Action mailed Feb. 17, 2009 in co-pending U.S. Appl. No. 11/724,313.

Office Action mailed Oct. 28, 2009 in co-pending U.S. Appl. No. 11/724,313.

Transmittal of Search Report and Written Opinion or Declaration for PCT/SE2006/050022 mailed Jun. 20, 2007.

Search Report and Written for Austrian Application No. 200718776-8 mailed Aug. 5, 2009.

* cited by examiner

| Cash Record | Balance | Limit |
|---|---|---|
| cr1 | 0 | 1000 000 |
| cr2 | 0 | 1000 000 |
| cr3 | 0 | 1000 000 |
| cr4 | 0 | 0 |
| cr5 | 500 000 | 1000 000 |
| cr6 | 0 | 1000 000 |
| cr7 | 0 | 1000 000 |
| cr8 | 700 000 | 0 |
| cr9 | -1200 000 | 1000 000 000 000 |

FIG. 5

| Trade | Debit | Credit |
|---|---|---|
| 1. (cr1→cr2, 1000) | cr1 -= 1000 | cr2 += 1000 |
| 2. (cr1→cr4, 2000) | cr1, cr3 -= 2000 | cr4 += 2000 |
| 3. (cr1→cr6, 3000) | cr1, cr3, cr5 -= 3000 | cr8,cr7,cr6 += 3000 |

| Cash Record | Available cash |
|---|---|
| cr1 | 994 000 |
| cr2 | 1 001 000 |
| cr3 | 995 000 |
| cr4 | 1 002 000 |
| cr5 | 497 000 |
| cr6 | 1 003 000 |
| cr7 | 1 003 000 |
| cr8 | 703 000 |
| cr9 | -1 200 000 |

FIG. 6

| Settlement Obligation | Debit/Credit |
|---|---|
| SO1 | cr1 -= 100 |
| SO2 | cr2 += 20 |
| SO3 | cr5 += 50 |
| SO4 | cr4 += 40 |
| SO5 | cr7 += 10 |
| SO6 | cr6 -= 20 |

FIG. 7

| Propagating Obligation | Gross | Net |
|---|---|---|
| PO1 | cr3 -= 100 | -100+20 = -80 |
| PO2 | cr5 -= 100 | -100+20+40 = -40 |
| PO3 | cr9 -= 100 | -100-20+20+50+40+10 = 0 |
| PO4 | cr7 -= 20 | -20 |
| PO5 | cr8 -= 20 | -20+10 = -10 |
| PO6 | cr9 -= 20 | |
| PO7 | cr3 += 20 | |
| PO8 | cr5 += 20 | |
| PO9 | cr9 += 20 | |
| PO10 | cr9 += 50 | |
| PO11 | cr5 += 40 | |
| PO12 | cr9 += 40 | |
| PO13 | cr8 += 10 | 10 |
| PO14 | cr9 += 10 | |

SECURITIES SETTLEMENT SYSTEM

CROSS-REFERENCE

This application is a new U.S. utility application claiming priority to U.S. Provisional Application No. 60/789,574 filed Apr. 6, 2006, the entire content of which is hereby incorporated by reference in this application.

The technology described herein relates to a securities settlement system and methods related to such system.

BACKGROUND

Globalization has directly impacted various aspects of the Centralized Securities Depository (CSD) market sector. A drive for consistency and a more standardized approach in operations and systems has resulted. In addition, there is continuous pressure on participants and operators to improve efficiency in all elements of the transaction value chain.

CSDs are exposed to more complicated securities and resultant activities, e.g. Corporate Actions, because of the global perspective and market refinement. Processes and systems must now be much more adaptable. In such a dynamic environment "speed to market" of new products and services is critical. The CSD systems must facilitate this "speed", which can be achieved by flexible, generic functionality for the different steps in settlement or other processes.

Transactions between market participants require matching and settlement. Trades can be captured directly from a trading (exchange) system or other external system, such as a CCP, matching service or back office STP system or manually entered by participants. Trade matching and confirmation prepare transactions for settlement according to applicable settlement rules. Assets and financing are verified, and securities may be locked-in in the investor CSD prior to settlement.

One important factor is the handling of liquidity/cash/credits. Normally, there is one or more payment systems present. A payment system could be a central bank of a country, one or more commercial banks of a country or some other entity (for instance the securities settlement system), or a combination.

The payment system interfaces the securities settlement system. There are basically three known models presently used. The first model is an interfaced model, or a real-time settlement model, where no cash is handled at all in the securities settlement system, instead a message is sent to the payment system each time a transfer of liquidity is necessary. The second model is a dedicated model, or a prefunding model, where cash is moved into the securities settlement system and is locked during the entire settlement period (normally a day). The third model is an integrated model, or liquidity transfer model, which is a combination of the first two models, i.e. cash is prefunded into the securities settlement system but not completely locked, thus enabling further transfers of liquidity between the payment system and the securities settlement system.

SUMMARY

It is an object to achieve a securities settlement system in which handling of cash is reduced to a minimum and/or credit handling is made more effective.

It is also an object to achieve a securities settlement system in which liquidity requirements and usage of credit limits are minimized.

These objects are achieved by a securities settlement system for settling trades in central depository systems, comprising a credit line structure forming a tree structure comprising a number of levels with liquidity nodes and/or credit nodes and a control system for minimizing the transfer of cash between accounts by propagating obligations for each node in the tree structure to a highest common level.

In one example embodiment the credit line structure may preferably comprise one level comprising liquidity nodes representing cash providers and one level comprising a credit node substructure for each liquidity node. Such substructure may include any number of sublevels or hierarchy of credit nodes (ranging from zero and up).

It is in one example embodiment advantageous to include a zeroth level connecting the liquidity nodes to a balancing node, or balancing account, that is connectable with a payment system via an interface of the securities settlement system.

An advantageous improvement is achieved when the control system is adapted to forecast future transfers based on settlement instructions. Forecasts can be based on matched, but unsettled, trades as well as on unmatched trades (or both).

In one example embodiment of a securities settlement system plural credit line structures are used in parallel, each credit line structure handling different currencies.

DETAILED DESCRIPTION

In the following examples will be disclosed mainly directed to an integrated model securities settlement system. It should however be emphasized that the technology described herein is equally suitable for other models, such as the interfaced and dedicated models.

As established above the securities settlement system (SSS) should provide a low-risk way to settle security transactions. This means that settlements of securities combined with cash (for instance delivery versus payment) should be performed with minimal risk that each transaction fails, but also that the systemic risk is minimized.

A main factor to minimize risk is to settle in central bank money, which has the lowest risk. There are several models for supporting settlement in central bank money for a SSS. The ECB (European Central Bank) identifies three main models for settling in Central Bank money.

One of them, the integrated model, "insources" central bank liquidity in the SSS, and in that way handle the complete transaction clearing and settlement within the SSS. In this way, the SSS has the full responsibility for the liquidity of cash and securities in the clearing and settlement process, and can minimize the liquidity and transaction risk.

Liquidity risk is minimized when the clearing process can process all transactions optimally, as all cash and security is under direct control, also the cash liquidity tied up in the SSS can be transferred back to the payment system in real time. Allowing the SSS to control both cash and securities and thus guaranteeing as simultaneous DvP as possible minimizes transaction risk.

To minimize systemic risk, the primary concern is to make sure that the risk taken on by the cash providers is managed and kept to a minimum.

The risk between cash providers once transactions reach settled status in the SSS should be nil. Therefore, the account keeping of the liquidity that the cash providers has transferred into the SSS from the central bank must be fail-safe and transparent. In each moment, each cash provider's liquidity pool within the SSS must be clear, and the only way this pool may change is via transfer from or to the central bank, or as a settlement against another cash provider.

The SSS must also manage the risk that the cash provider takes on for its clients. Clients in this case may be clearing participants and issuer representatives that use the cash provider's liquidity in settlement or corporate actions.

To allow for the cash provider do this, a system of managed credit lines to clients is required. The credits should be possible to manage in several levels. This flexibility is required to allow the cash providers and the users of credit, to adopt the credit structure to their own participant structure, and not least, to allow credit users to also pose internal credit limits within their own organization.

The credit accounting system must be clearly separated from the liquidity accounting. As the credit lines are multi level, the ways that the credit balances may change on a credit account, is by direct settlements against other cash records, by credit used by depending cash records or by adjustments made to the credit limits.

In a modified integrated model, the handling of central bank liquidity within the SSS requires an interface to the central bank where cash can be transferred from a cash provider's central bank account into the SSS and from a cash provider's account in the SSS to the cash provider's account in the central bank.

To make the settlement system a generally adaptable product, this interface could preferably be based on general Society for Worldwide Interbank Financial Telecommunication (SWIFT) payment messages, although no ISO standard applies. This would allow a simple adaptation to each different CSD, and will also serve as a base for other payment interfaces such as to commercial banks for foreign exchange (FX) settlement.

The general solution must also provide a base for settlement with direct real time gross settlement (RTGS) transaction to the payment system. This means that the settlement in the SSS involves a direct RTGS transaction between the involved cash providers in the payment system, without using liquidity that has been transferred into the SSS.

The primary cash providers that have central bank accounts and provide settlement in the settlement system with liquidity require a mean to handle their liquidity that they will provide in the system. The representation of the liquidity on designated liquidity cash records; clearly show what the cash provider's liquidity is at every moment.

All cash provider's liquidity in one currency is pooled in one liquidity cash record. This means that all settlements that the cash provider is involved in directly or indirectly through client clearing participant, will affect the liquidity cash record if another cash provider is involved on the other side of the transaction. This is always true although there may be several levels of credit cash records below the liquidity cash record.

The in-sourced central bank liquidity must not limit the settlement banks total liquidity management outside the SSS. Thus the cash providers should be able to transfer liquidity in or out of the settlement system at any moment.

Other than transfers in and out of the system, the only way a balance may be updated on a LCR is thus when a settlement is performed that consists of an obligation against another cash provider.

To handle the requirement that liquidity cash records have a direct relationship with a central bank currency, and to maintain a control with the balance of cash in the system, a payment system cash record is required.

This keeps a total balance of cash in the system, which is debited when cash is transferred into the system, and credited when transferred out. At any point in time the balance of a payment system cash record can be used to reconciliate against the balance of the National Central Bank (NCB).

The credit cash records are required as a way for cash provider to limit the liquidity risk taken in settlement. The cash provider should be able pose limits on the liquidity that each clearing participants may use. The CCR should also allow the cash provider to control limits on a finer level with limits for different purposes and internal organizational units.

It is required that this flexibility is also extended to the clients of the primary cash providers, allowing participants in the SSS to set up internal credit limits by creating additional levels of credit cash records to control credit usage within the own organization.

The liquidity control required may be a standing one-day limit amount, and also the possibility to intervene and stop the credit line as well as stop individual transactions. The possibility to intervene should be based on the possibility to do temporary credit limit changes on cash records and to prioritize settlement obligations as is possible in known settlement systems today.

The cash provider must have immediate control over the credit limits, to be able to manage their risks. This means that all attributes concerning limits and temporary limits as well as the possibility to 'inactivate' a cash record must be possible to perform immediately intraday.

It is required that the cash records are ordered in a clear hierarchical structure, so that the distinction between liquidity and credit cash records is clear, and that the several levels of credit lines are possible.

The structure will unambiguously link the payment system cash record to the associated liquidity cash records. In the same way, any number of credit levels added under a liquidity cash record will unambiguously link back to the liquidity cash record.

The structure must ensure that the responsibilities for the levels are handled correctly. For example, the Cash Provider of a cash record must have the control of any limits and may only create 'child' cash records based on cash records where the cash provider is owner. A tentative example cash record structure has been illustrated in FIG. 1.

The payment system interface will 'create' cash in the settlement system when the cash is transferred into the system. This cash is 'CSD money' which is considered to be very close to central bank money in terms of risk, as the 'CSD money' is considered to be isolated for the CSD in the central bank.

Generally the interface must have high security, as potential errors or malicious attacks here would affect great monetary values.

Figure 2:
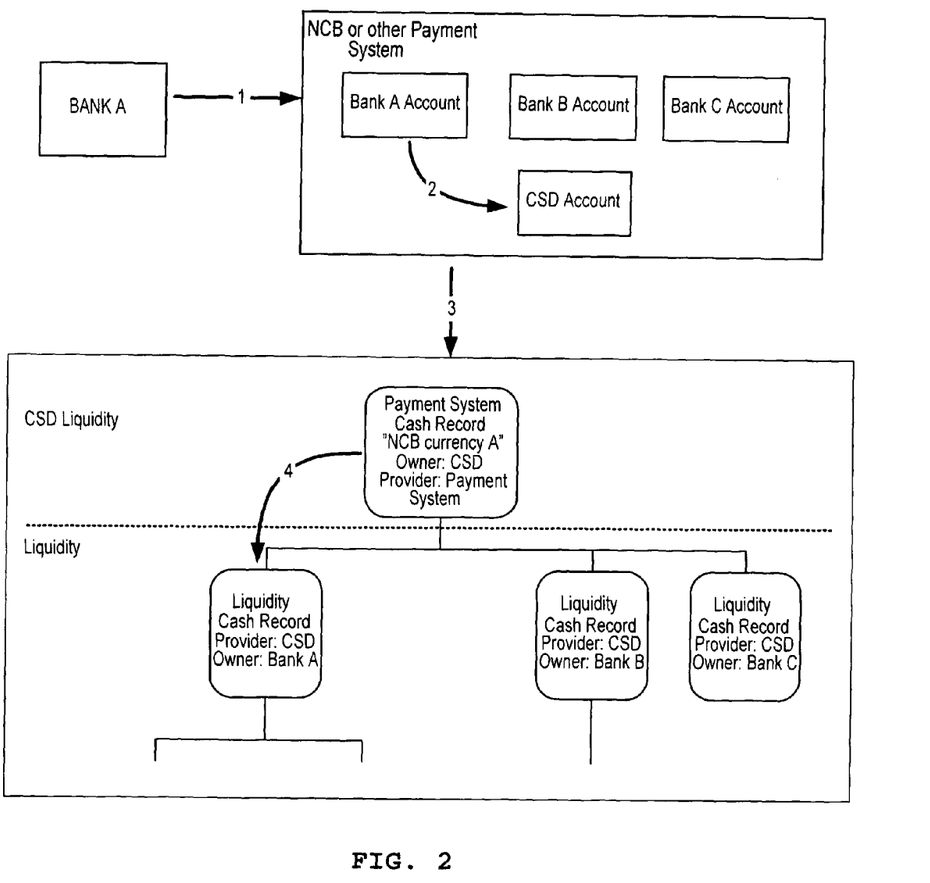
FIG. 2 discloses an example of a payment system flow.

When cash is transferred into the settlement system the flow could be as follows.
1. The settlement bank (primary cash provider) requests the NCB to transfer cash into the CSD account.
2. The NCB transfers the cash in the NCB from the settlement bank's account to the CSD account.
3. The NCB forwards the transfer instruction to the system as a message.
4. The system 'Increases' cash by debiting the payment system cash record and crediting the liquidity cash record of the settlement bank.

Potentially a confirmation message to the settlement bank could be included. This is subject to customer requirement and is not included in the settlement system.

In the case of a fall-back scenario where the link to the payment system is unavailable, a manual transfer could be initiated directly in step 4 above when the CSD operator has got physical evidence of a transfer in the payment system. The flow is illustrated in FIG. 2.

When cash is transferred out of the settlement system the flow is as follows.

Figure 3:
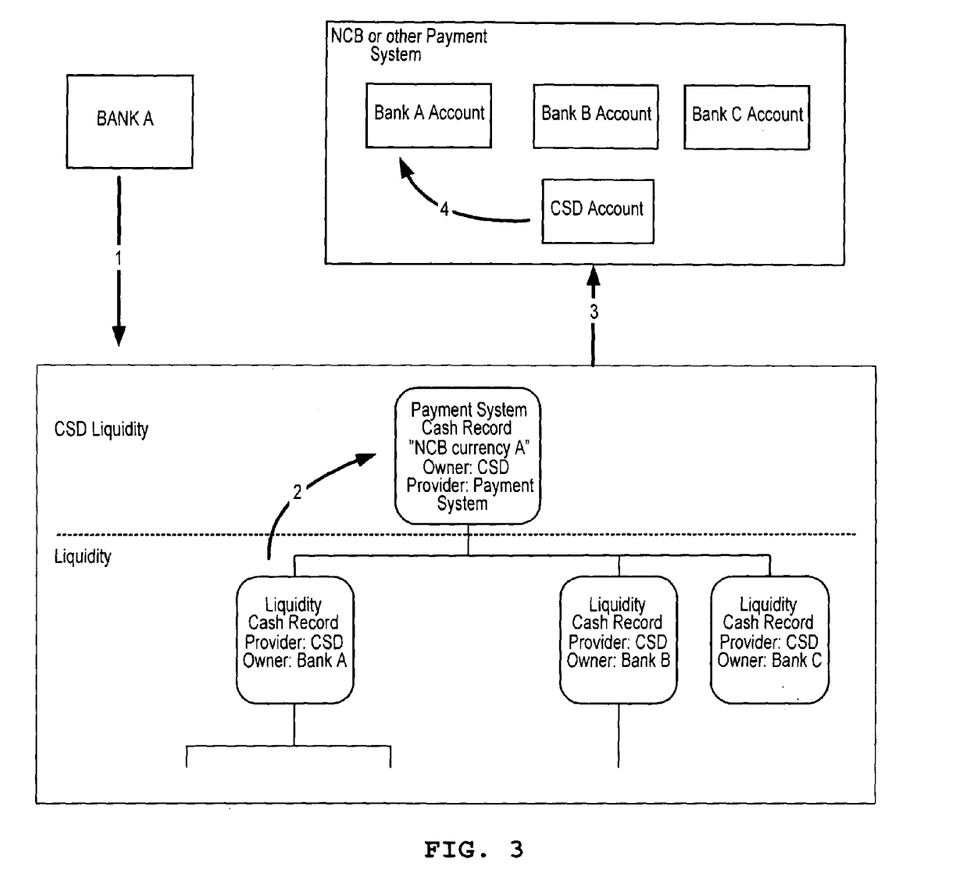
FIG. 3 discloses an alternative example of a payment system flow.

The settlement Bank (primary cash provider) requests the CSD to transfer into an account of the bank in the payment system, e.g. a National Central Bank (NCB). This is done through the system user interface, or via a message. The system 'decreases' cash by debiting the liquidity cash record of the settlement bank, and crediting the payment system cash record.

The settlement system forwards the transfer instruction to the NCB and the NCB transfers the cash from the CSD account to the settlement bank's account Optionally the NCB may confirm the transfer to the settlement system or the bank, and the system may confirm the transfer to the bank.

The flow is illustrated in FIG. 3.

The settlement system interface to the central bank should comply as far as possible to international standards and practices. There are no international standards, but European de facto standard is the TARGET network definition that defines the central bank communication using proprietary MT198 messages with subtype 202.

A single platform is foreseen for the European central banks, and the messaging decided on there for the settlement model allowing outsourced liquidity to a securities settlement system would rely on proprietary SWIFT messages.

Transfer requests can be formed only to be accepted from registered primary cash providers. (This is directly or indirectly attached to the ownership of a liquidity cash record in a specific currency).

Only the CSD may maintain the central bank connection. That is, create and maintain the liquidity level of cash records. This is guaranteed by the CSD being the cash record owner of the payment system cash record.

Authorization possibility must be available for all administration of the central bank link information as well as forced on all manual liquidity movements initiated though the user interface.

All payments that are cleared and settled, must be cleared and settled on all involved levels of cash records, based on the dependencies between cash records given by the structure. This must be done in order to guarantee that all involved credit limits checks are imposed, and that liquidity is checked and updated. Fundamentally, the location of the direct source and the recipient cash records of each payment transaction will decide how far up in the structure the payment must be cleared and settled.

The basic algorithm used for one-trade clearing should be aimed at minimizing the usage of cash on higher levels.

There must be a possibility for each cash record owner to prioritize between transactions on the 'own' level, both with settlements directly on that level, and with indirect, propagated obligations. However, the priorities need only to be Active and Deferred, constituting an on and off tool for the cash record owner.

The information on propagated payments available to the cash record owner must be limited in the same way as transaction information is limited for cash providers currently. This means that the full transaction information is not available, for example information on the purpose of the transaction.

The propagated payments records should be possible to view and reconcile. The historical information of the payment should also be equally treated.

Figure 4:
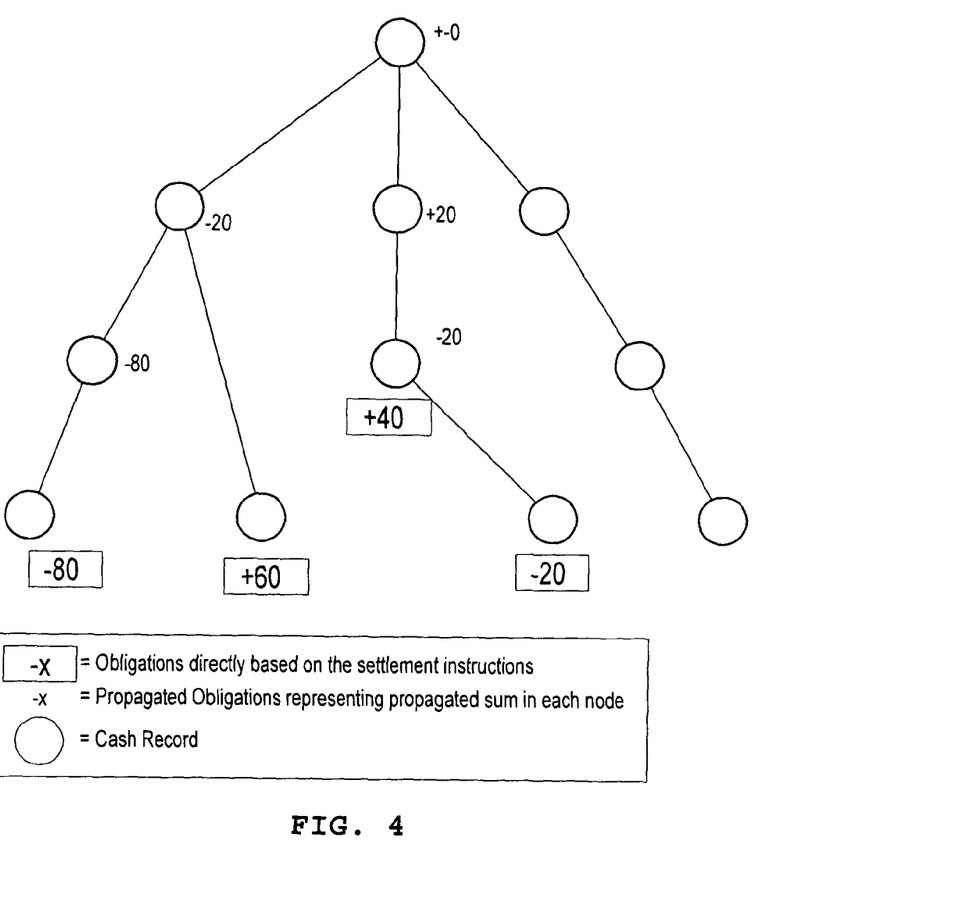
FIG. 4 discloses a first example of a flow for settlement in a credit line structure, FIG. 5 discloses a second example of a flow for settlement in a credit line structure, FIG. 6 discloses a third example of a flow for settlement in a credit line structure, FIG. 7 discloses a fourth example of a flow for settlement in a credit line structure, FIG. 8 examplifies a flow structure for computation of propagated net obligations.

FIG. 4 illustrates the effect of a settlement involving two payment destinations for each of the two parties.

The purpose of position forecasting is to allow the provider and the owner of cash records to predict the future cash need. This is based on future transactions, i.e., represented as settlement instructions that are yet to settle. Note that it might be necessary to distinguish between settlement instructions ready for settlement, and settlement instructions that are not yet ready (unmatched, lacking information, etc).

Position forecasting must be possible to perform with one cash record as the viewpoint and for a specific settlement date.

When position forecasting is done, calculated cash positions must account for the propagated effect on all cash records in the structure.

As discussed above, a cash transaction will have to control potentially several credit limits and a liquidity level in each of these cases:

Checking cash availability (E.g. optimization calculations)
Reserving cash (E.g. physical clearing prior to settlement)
Transferring cash (As a part of a settlement transaction)
These steps will have to be made in the majority of all settlement transactions and this step will have an impact on performance.

To implement support for payment levels, these cases are set up by linking cash records into a tree, where the root cash record represents the total amount of deposited cash in the settlement system. This is a cash record with "infinite" limit and a negative balance.

Figure 5:
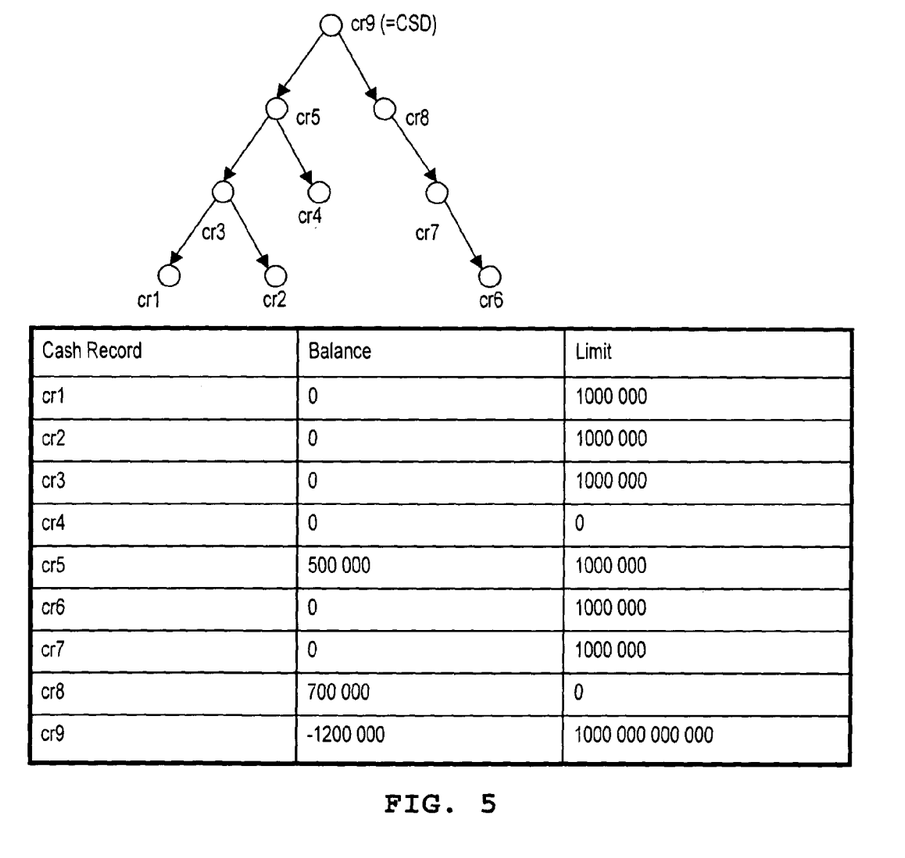

Each child of the root represents a cash record with real money, transferred into the settlement system from the central bank or another payment system (using SWIFT typically). Such top-level cash records have a zero limit, and a positive balance, where the balance equals the amount of cash the owning participant has reserved with the payment system on behalf of the CSD. Such records (cr5 and cr8) are shown in FIG. 5. The owner of such a cash record is a real cash provider, i.e they have a direct relationship with the payment system defined for the currency (only one payment system per currency is allowed).

Further levels of cash records represent the credit lines allocated by the top-level cash providers, where these may exceed the available cash of those cash providers in the settlement system. Such setups imply that the top-level cash providers grant large credit lines to trusted sub-level providers (such as branches of a bank or institutional customers).

The complication this setup creates is that clearing a cash debit must consider the payment levels each time, i.e. a debit is cleared if it does not exceed the available cash (i.e. balance+limit) at any level, when tree-walking from the debited cash record to the credited cash record.

Figure 6:
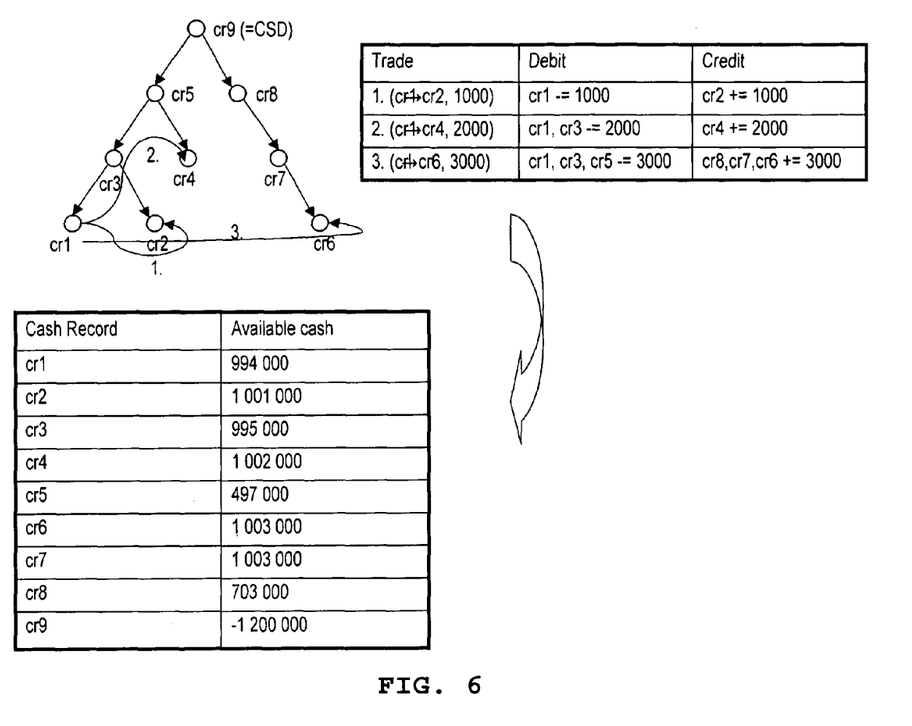

That is, the debited amount is checked in each node upwards, until a node is reached above the credited cash record. From this node and downwards the same amount is credited until the target cash record is reached, as seen in FIG. 6.

The initial cash is deposited via SWIFT messages, or in the future via automated liquidity support, which represent notifications from the payment system that money has been deposited on behalf of the participants referenced in the messages. In FIG. 6, these deposits are made into cr5 and cr8 (from cr9).

Whenever cash obligations are created, the cash record tree is traversed, and propagating obligations are generated to reflect the underlying instructions. Such obligations represent the net obligation for each intermediate node traversed while transferring the cash (as in the trades 1, 2, and 3 in FIG. 6).

Specifically, the obligation creation algorithm is as follows (we use the expression (CR, A) to refer to a settlement obligation that contains a payment instruction that updates the cash record CR with the amount A, which may be a negative amount).

Let (SI1, . . . , SIk) be the set of instructions chosen to be settled together, i.e. they will be settled by the same group, SOG.

Let (SO1, . . . , SOk) be the set of obligations, derived from the instructions, to be part of SOG.

For each obligation SOi (CR, Amount), create a propagating net obligation for each ancestor CR' of CR, that is (CR', Amount) is created for each ancestor cash record.

Net the list of propagating obligations, by combining each pair of obligations that refer to the same cash record CR. That is, replace obligations (CR, A) and (CR, B) with (CR, A+B), where either A or B may be negative.

Remove all propagating net obligations (CR, A), where A=0. The remaining net obligations are added to SOG.

Figure 7:
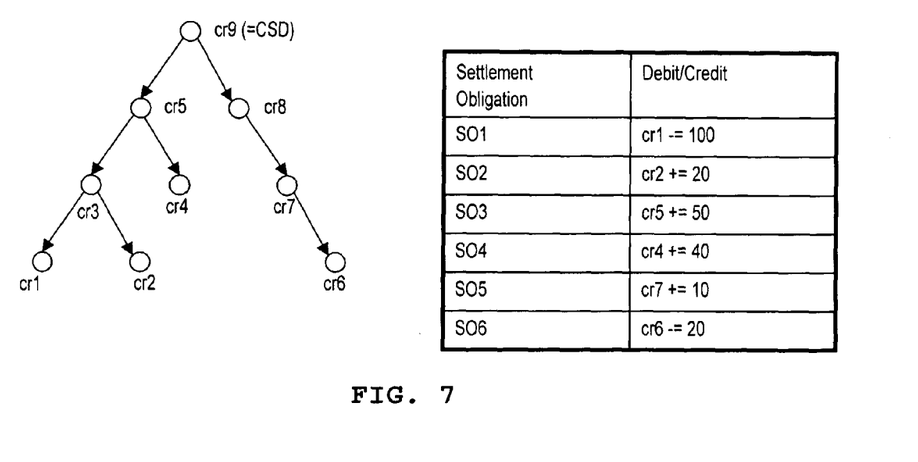

Consider the following example in relation to FIG. 7. First, consider the list of selected settlement obligations.

There are thus 6 obligations that transfer 120 in cash in the group.

Figure 8:
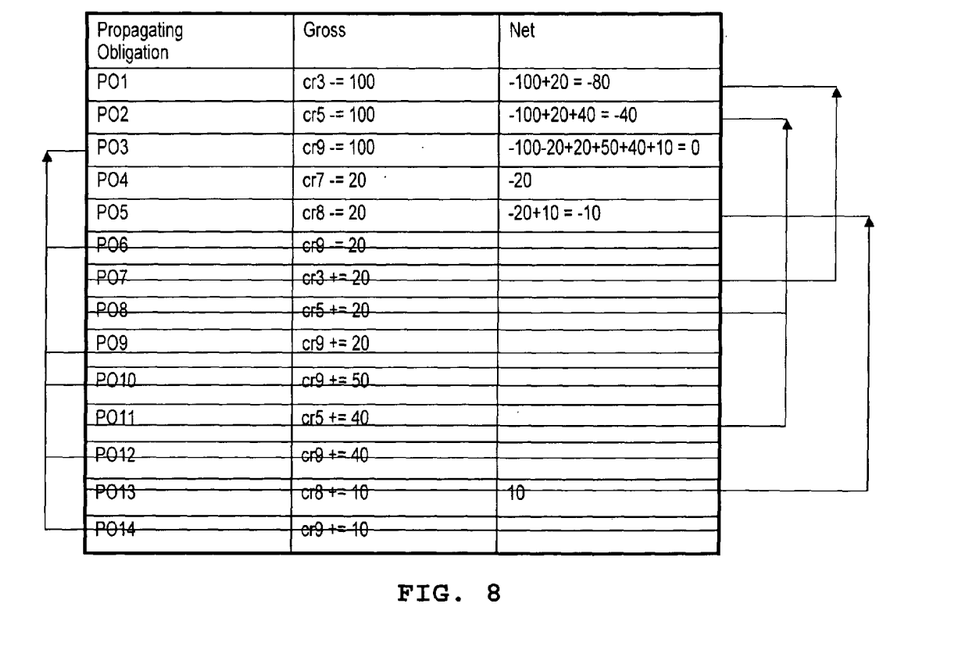

To complete the group, the propagating net obligations have to be computed, which is done according to the steps listed in FIG. 8.

There are thus 14 such obligations created initially, and then netted into 4 non-zero obligations (PO1, PO2, PO4, PO5). The final list of obligations in the group are thus: (SO1, . . . , SO6, PO1, PO2, PO4, PO5).

The above algorithm can be used for propagating payment obligations in both gross and net setttlements.

Cash record transactions must reflect whether the debit/credit was propagated, by reflecting the fact that the transaction was made by a propagating net obligation. Hence, in the transaction view for cash records, the list of transactions on a cash record may therefore include propagating obligations (for which there are no instructions, hence, the view must take this into account).

Figure 9:
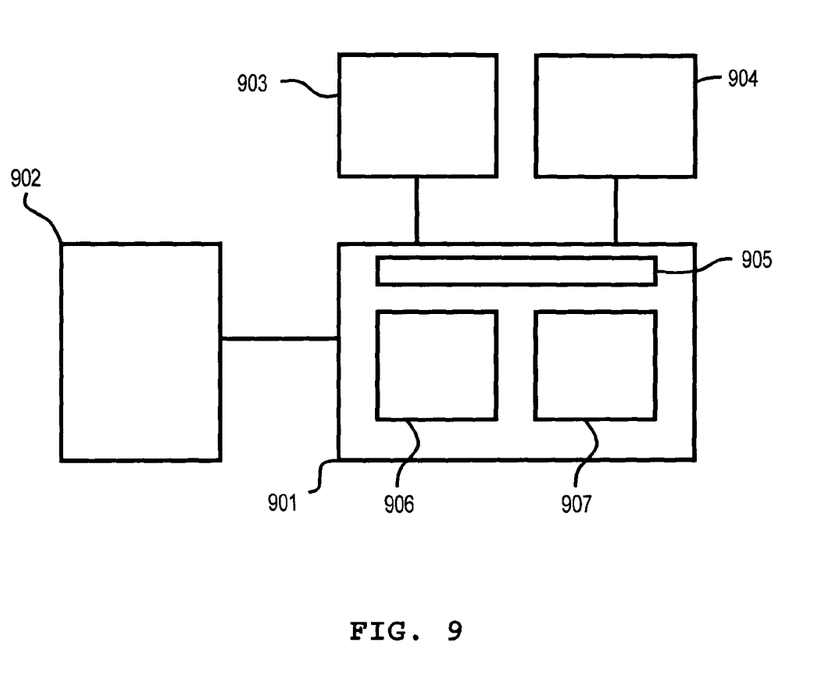
FIG. 9 shows an example of a securities settlement system.

FIG. 9 shows an embodiment of how a securities settlement system 901 may be set up. The securities settlement system 901 is connected to a trading system 902 from which it at least receives information regarding matched trades. Naturally, the securities settlement system 901 can be connected to several trading systems dealing with same or different kinds of financial instruments and/or any other source of information regarding a trade or similar to be settled on the securities settlement system 901. Also, the information provided from the trading system 902 (and any other trading system connected to the securities settlement system 901) may also include information regarding orders and quotes that has not been matched.

The securities settlement system 901 is further connected to a first payment system 903 and a second payment system 904. The payment systems 903, 904 could be banks or other institutions/organizations. A typical example of a bank that can be connected to the securities settlement system 901 is a national central bank. The number of payment systems connected to the securities settlement system 901 could be more or fewer than the two shown in the figure.

Internally, the securities settlement system 901 functionally comprises inter alia an interface 905, a credit line structure unit 906 and a control unit 907. These can be realized with hardware alone or hardware controlled using software (e.g., a computer) in several ways. As an example the hardware may consist of one or more computer servers (HP or other brand) for web services, applications services, database and network infrastructure.

Figure 1:
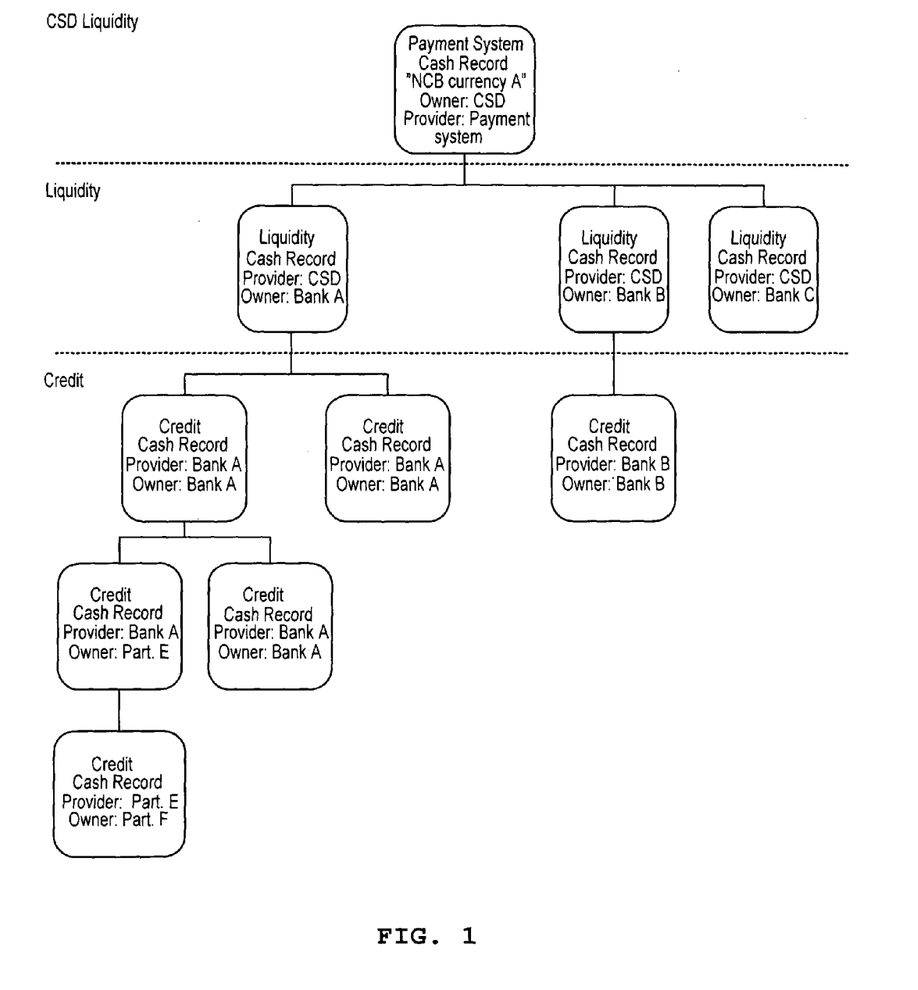
FIG. 1 discloses an example of a cash record, or credit line structure.

The credit line structure unit 906 is designed to host a credit line structure such as the one shown in FIG. 1 and the control unit 907 is adapted to inter alia carry out the propagation features and other control flows described above.

The invention claimed is:

1. A securities settlement system for settling a trade between trading entities, comprising:
   an interface configured to communicate cash balances with one or more payment systems;
   a memory that stores cash and credit line information in a cash and credit line tree structure including multiple levels with (1) credit cash records or (2) liquidity cash records and credit cash records; and
   a computer, coupled to the interface and the memory, configured to settle cash obligations to pay or receive cash which are associated with the trade by reducing or minimizing a transfer of cash between cash records in the cash and credit line tree structure for participants associated with the trade to produce a resulting cash balance,
   wherein the computer is configured to reduce or minimize the transfer of cash by propagating cash obligations associated with the trade in the cash and credit line tree structure to a highest common cash record in the cash and credit line tree structure where the cash obligations associated with the trade cancel, and
   wherein the computer is further configured to send via the interface to the one or more payment systems the resulting cash balance.

2. A securities settlement system according to claim 1, wherein the cash and credit line tree structure comprises a first level including liquidity cash records, each liquidity cash record representing a cash provider.

3. A securities settlement system according to claim 2, wherein the cash and credit line tree structure comprises a second level comprising a substructure of credit cash records for each liquidity cash record on the first level.

4. A securities settlement system according to claim 1, wherein the interface is configured to transfer cash to and/or from a cash provider's payment system's account.

5. A securities settlement system according to claim 4, wherein the cash and credit line tree structure comprises a zero-th level having a root cash record linking to all liquidity cash records, which root cash record acts as a balancing account with respect to the one or more payment systems.

6. A securities settlement system according to claim 5, wherein the computer is configured to forecast future transfers based on settlement instructions.

7. A securities settlement system according to claim 6, wherein the settlement instructions relate to matched unsettled trades.

8. A securities settlement system according to claim 6, wherein the settlement instructions relate to unmatched trades.

9. A securities settlement system according to claim 1, wherein the memory stores multiple cash and credit line tree structures, one for each currency that is handled by the system.

10. A securities settlement system according to claim 1, wherein the securities settlement system is in a central depository system.

11. A method for settling a trade between trading entities in a securities settlement system, comprising:
 communicating cash balances via an interface with one or more payment systems;
 storing in a memory cash and credit line information in a cash and credit line tree structure including multiple levels with (1) credit cash records or (2) liquidity cash records and credit cash records; and
 settling by a computer linked to the memory and to the interface cash obligations to pay or receive cash which are associated with the trade by reducing or minimizing a transfer of cash between cash records in the cash and credit line tree structure for participants associated with the trade to produce a resulting cash balance,
 reducing or minimizing by the computer the transfer of cash by propagating cash obligations associated with the trade in the cash and credit line tree structure to a highest common cash record in the cash and credit line tree structure where the cash obligations associated with the trade cancel, and
 sending by the computer via the interface to the one or more payment systems the resulting cash balance.

12. A method according to claim 11, wherein the cash and credit line tree structure comprises a first level including liquidity cash records, each liquidity cash record representing a cash provider.

13. A method according to claim 12, wherein the cash and credit line tree structure comprises a second level including a substructure of credit cash records for each liquidity cash record on the first level.

14. A method according to claim 11, wherein the interface transfers cash to and/or from a cash provider's payment system's account.

15. A method according to claim 14, wherein the cash and credit line tree structure comprises a zero-th level having a root cash record linking to all liquidity cash records, which root cash record acts as a balancing account with respect to the one or more payment systems.

16. A method according to claim 15, wherein the computer forecasts future transfers based on settlement instructions.

17. A method according to claim 16, wherein the settlement instructions relate to matched unsettled trades.

18. A method according to claim 16, wherein the settlement instructions relate to unmatched trades.

19. A method according to claim 11, wherein the memory stores multiple cash and credit line tree structures, one for each currency that is handled by the system.

20. A securities settlement system for settling a trade between trading entities in a securities settlement system, comprising:
 means for communicating cash balances with one or more payment systems;
 means for storing in a memory a credit line structure forming a cash and credit line tree structure including multiple levels with (1) credit cash records or (2) liquidity cash records and credit cash records; and
 means, coupled to the means for communicating and the means for storing, for settling cash obligations to pay or receive cash which are associated with the trade by reducing or minimizing a transfer of cash between cash records in the cash and credit line tree structure for participants associated with the trade to produce a resulting cash balance by propagating cash obligations associated with the trade in the cash and credit line tree structure to a highest common cash record in the cash and credit line tree structure where the cash obligations associated with the trade cancel, and
 means for sending to the one or more payment systems the resulting cash balance.

21. A securities settlement system according to claim 20, wherein the cash and credit line tree structure comprises a first level including liquidity cash records, each liquidity cash record representing a cash provider, and wherein the cash and credit line tree structure comprises a second level including a substructure of credit cash records for each liquidity cash record on the first level.

22. A securities settlement system according to claim 20, wherein the cash and credit line tree structure comprises a zero-th level having a root cash record linking to all liquidity cash records, which root cash record acts as a balancing account with respect to the one or more payment systems.

23. A securities settlement system according to claim 20, wherein the securities settlement system is in a central depository system.

* * * * *